Figure 1:
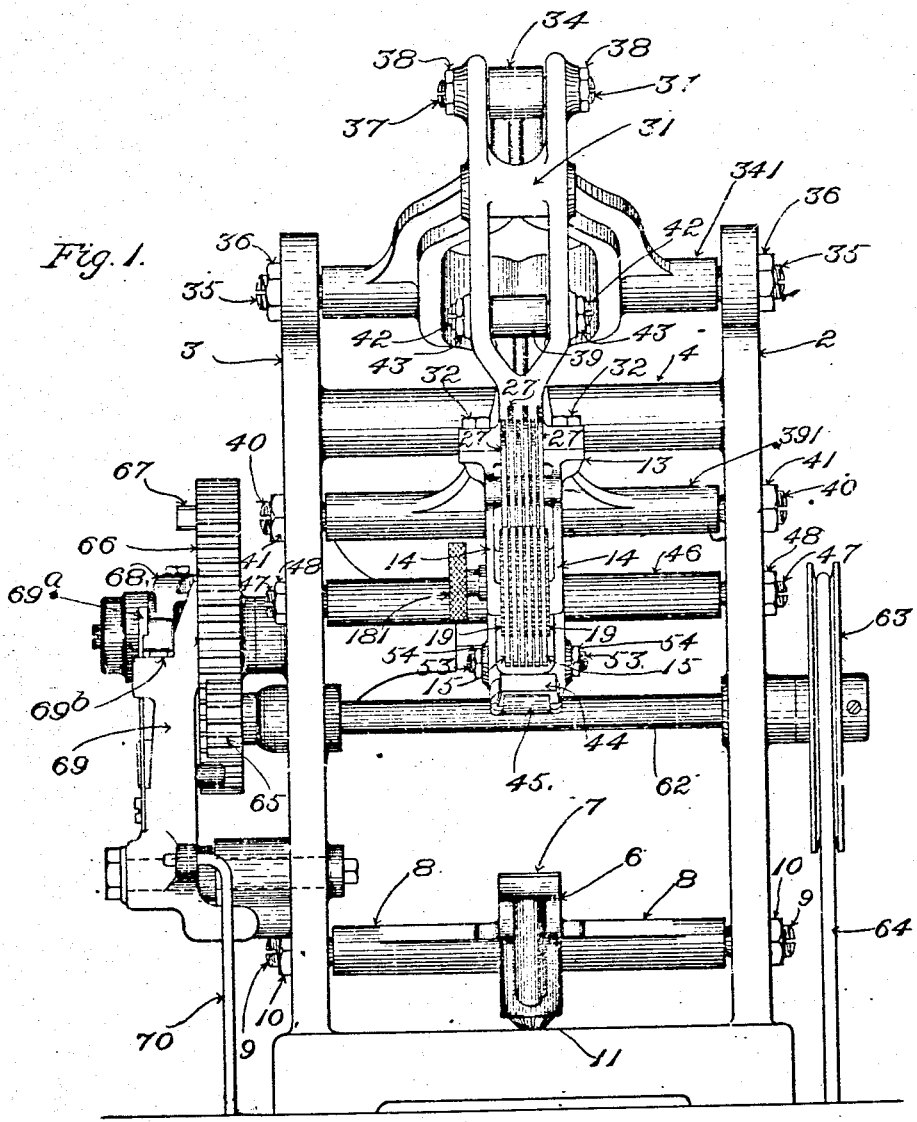

F. W. MERRICK.
STAMPING, MARKING, OR NUMBERING MACHINE.
APPLICATION FILED JUNE 12, 1907.

960,029.

Patented May 31, 1910.
6 SHEETS—SHEET 1.

Witnesses:
Oscar F. Hill
Edith J. Anderson

Inventor:
Frank W. Merrick
By Chas. F. Randall
Attorney.

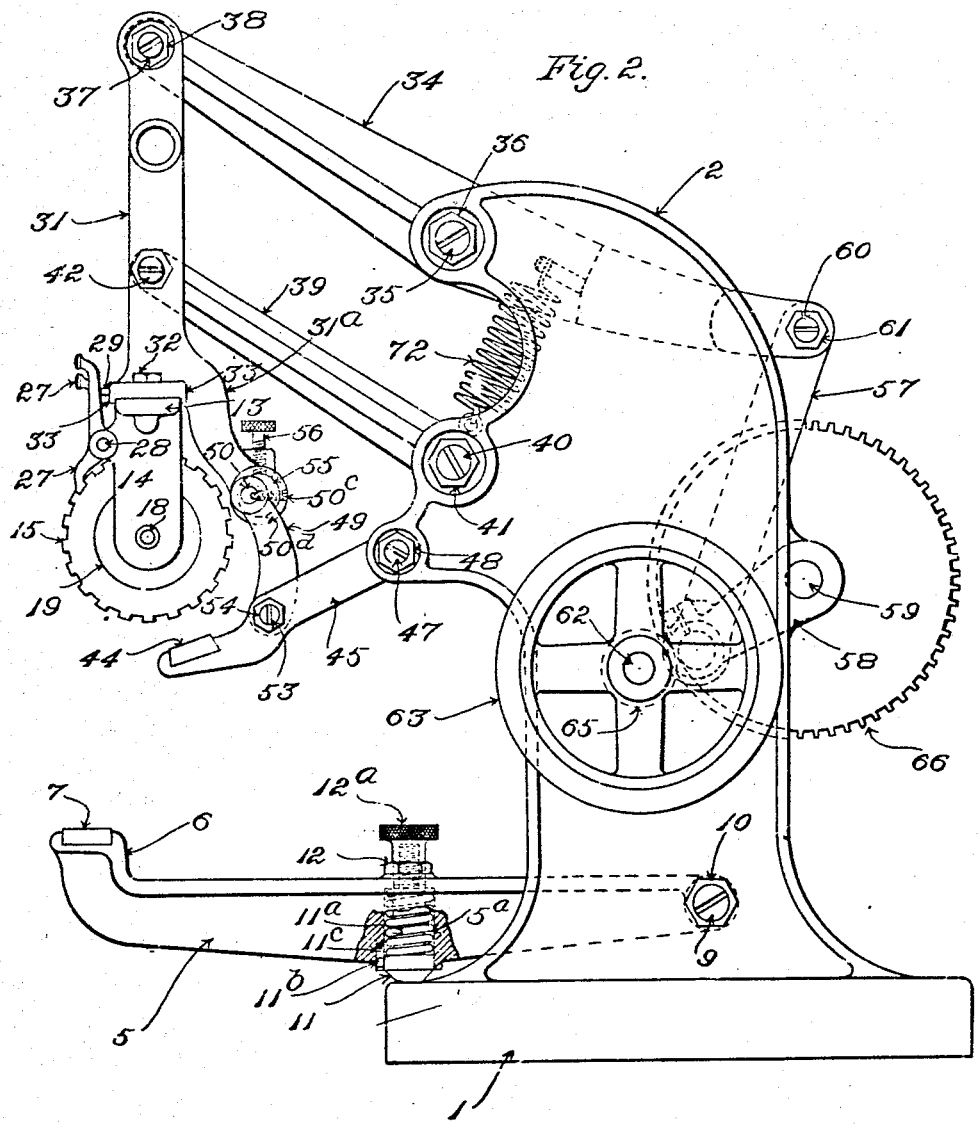

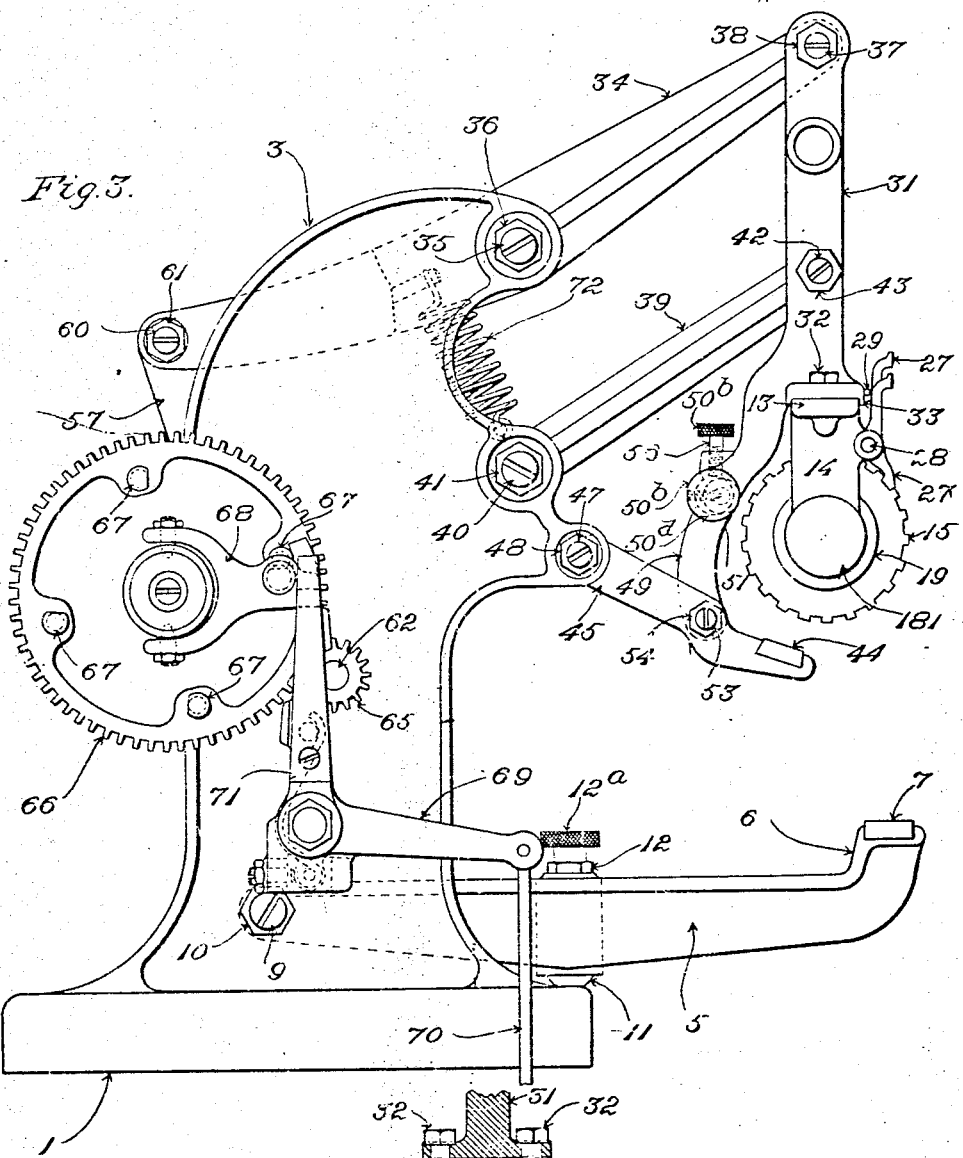

F. W. MERRICK.
STAMPING, MARKING, OR NUMBERING MACHINE.
APPLICATION FILED JUNE 12, 1907.
960,029.
Patented May 31, 1910.
6 SHEETS—SHEET 4.
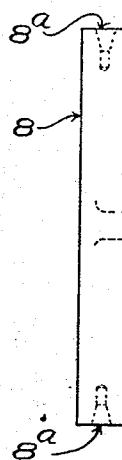
Fig. 5.
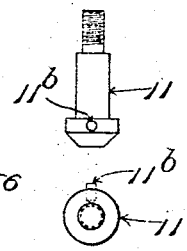
Fig. 6.
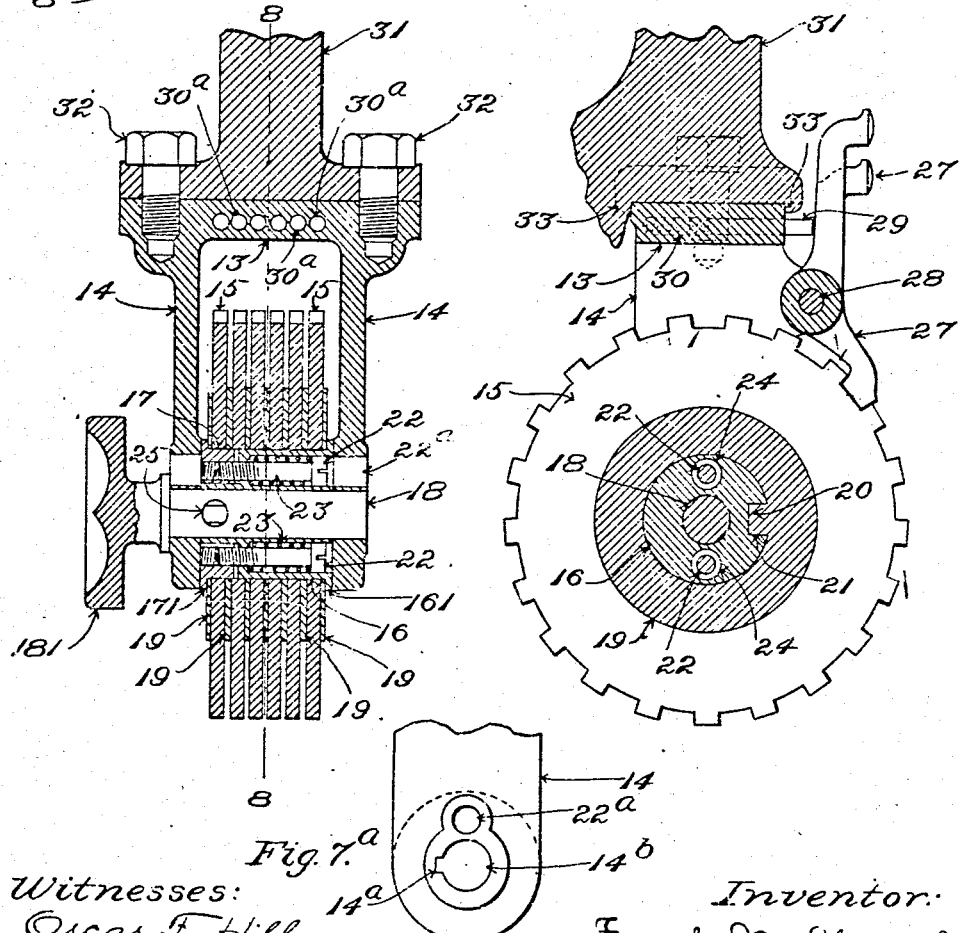
Witnesses:
Oscar F. Hill
Edith J. Anderson.
Inventor:
Frank W. Merrick
by Chas. F. Randall
Attorney.

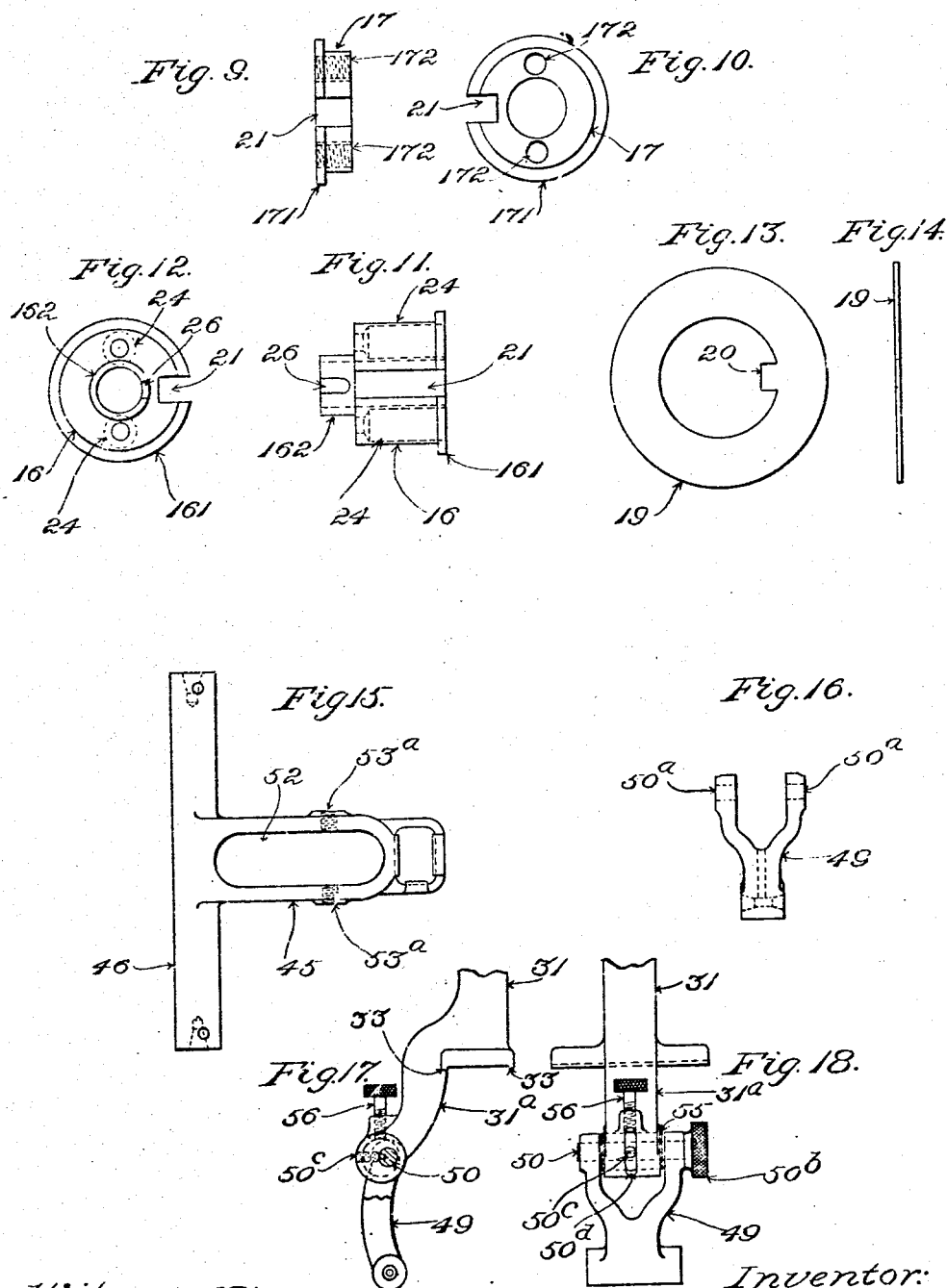

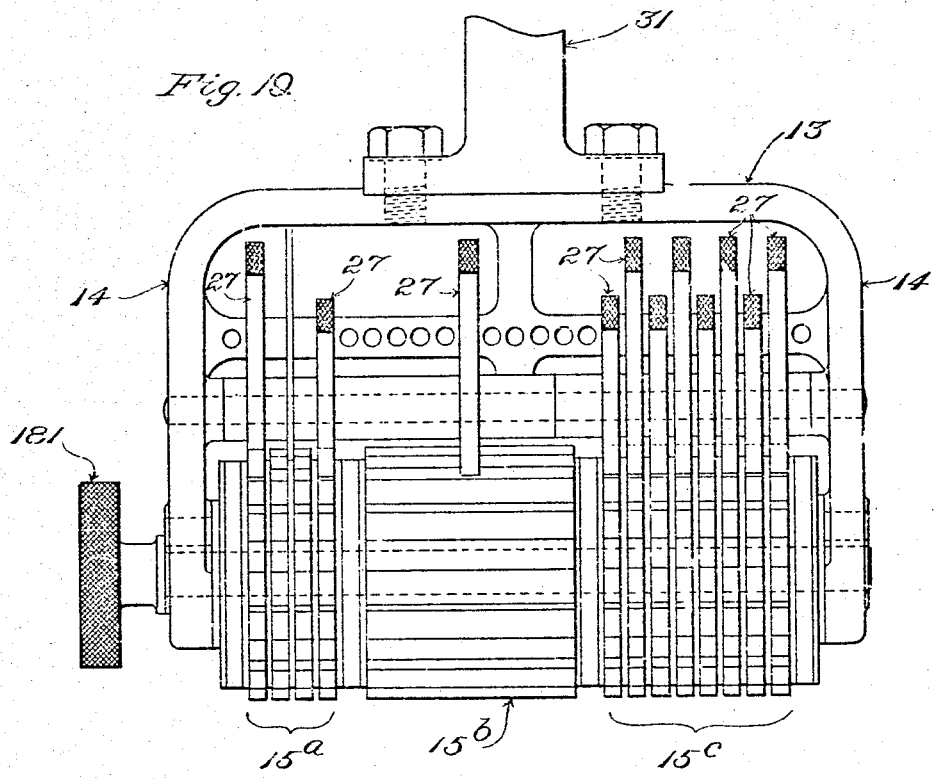

UNITED STATES PATENT OFFICE.

FRANK W. MERRICK, OF BOSTON, MASSACHUSETTS.

STAMPING, MARKING, OR NUMBERING MACHINE.

960,029.    Specification of Letters Patent.    Patented May 31, 1910.

Application filed June 12, 1907. Serial No. 378,609.

*To all whom it may concern:*

Be it known that I, FRANK W. MERRICK, a citizen of the United States, residing at Boston, in the county of Suffolk, State of Massachusetts, have invented a certain new and useful Improvement in Stamping, Marking, or Numbering Machines, of which the following is a specification, reference being had therein to the accompanying drawings.

The invention has for its general object to provide a stamping, marking, or numbering machine having a wide range of adaptability rendering it suitable for use for the purpose of imprinting letters, numerals, and other characters upon linings, upper leather, etc., in the manufacture of shoes, to indicate width and size of shoe, case number, etc., and upon cartons or other containers of goods to indicate the contents thereof; and for the purpose of stamping or imprinting name, size, etc., or name of manufacturer or dealer upon corsets, collars and cuffs, underwear, hosiery, and many other articles; as well as for imprinting identifying characters upon linen sent to a laundry; and for various other purposes.

The invention comprises various features of improvement which I will explain with the aid of the accompanying drawings, in which latter the invention is shown embodied in a machine comprising, essentially, a support for the article to be imprinted or stamped, a type-head provided with a series of settable type-carriers, a type-head carrier, a lever-like rocker having the said type-head carrier connected pivotally with one arm thereof, a swinging radius-arm or link also connected with the type-head carrier and coöperating with the said rocker in controlling the path of movement of the type-head, a carrier for an inking-device operatively connected with the said type-head carrier and actuated thereby, a rotating crank in operative connection with the other arm of the said lever-like rocker for actuating the latter when the type-head is to be operated, power driving-connections, a clutch through which the said crank may be driven, and start-and-stop mechanism in connection with the said clutch whereby at the will of the operator the machine may be caused to operate to produce a printing operation and then, if desired, come to rest.

One principle on which the machine has been constructed in embodying my invention is that of facilitating the application to the work-support of the thing or article which is to be printed or stamped. To provide for printing or marking upon cartons or other articles which require to fit over or around the work-support, the latter is arranged upon the free extremity of a supporting arm, and to enable this printing or marking to be effected at a distance from the rear edge of the surface of the carton or other article to be printed upon, the said arm is caused to project to an ample corresponding extent from the bed or table and other portions of the machine frame. To enable the printing or marking to be effected transversely across any desired portion of the length of a strip-like article, the machine frame is constructed with opposite upright sides or cheeks between which a clear space exists at the rear of the work-support, permitting a long article to be pushed back as far as may be required between the said sides or cheeks.

Other principles on which the machine has been designed are that of simplifying the construction of the machine by forming the main working parts as arms, and pivotally hanging or connecting the same; and that of facilitating the application of certain of the said parts to the machine frame by constructing them with rockers having oppositely-extending supporting portions which are interposed between the upright side-pieces or cheeks, aforesaid, of the machine frame.

Another principle is that of dispensing with ordinary cylindrical bearings as far as possible by mounting and connecting parts pivotally through the employment of adjustable opposed taper centers; and, further, dispensing with fixed guides for reciprocating parts, through the utilization of swinging arms and rockers such as are mentioned above for the purpose of transmitting movement and controlling the direction and the path thereof.

In the drawings, Figure 1 shows the machine aforesaid in front elevation. Fig. 2, Sheet 2, is an end elevation thereof, looking at the driving end, with a small portion of the work-support arm broken away. Fig. 3, Sheet 3, is an end elevation thereof, looking at the clutch end. Fig. 4, Sheet 3, is a detail view in section, on the same scale as Figs. 1, 2 and 3, showing a portion of the type-head carrier, and the type-head. Fig.

5, Sheet 4, is a plan of the work-support, detached. Fig. 6, Sheet 4, shows views of the spring-actuated pin, hereinafter described, which is employed for supporting the work-support in its normal position. Fig. 7, Sheet 4, is a view similar to Fig. 4, Sheet 3, but on an enlarged scale. Fig. 7ᵃ, Sheet 4, shows in side elevation the lower end of one of the cheek-pieces of the type-head of Figs. 1 to 4. Fig. 8, Sheet 4, is a view showing the parts of Figs. 4 and 7 in section in the plane of the line 8, 8, in Fig. 7. Fig. 9, Sheet 5, shows in elevation, one of the two sections of the barrel upon which the type-wheels are mounted. Fig. 10, Sheet 5, is a side elevation of the section shown in Fig. 9. Fig. 11, Sheet 5, shows the other section of the barrel in elevation. Fig. 12, Sheet 5, is a side elevation of the section shown in Fig. 11. Fig. 13, Sheet 5, shows in side elevation one of the washers which are employed between the type-wheels, and Fig. 14, same sheet, is an edge view thereof. Fig. 15, Sheet 5, shows in plan the ink-pad carrier and ink-pad, on the same scale as Figs. 1, 2, 3. Fig. 16, Sheet 5, shows in front elevation on the same scale, the link which connects the inking-pad carrier with the type-head carrier. Fig. 17, Sheet 5, is a detail view in side elevation of the lower part of the type-head carrier, the link through which movement is transmitted from the said carrier to the ink-pad carrier, and the means for connecting the link with the type-head carrier with capacity for adjustment to vary the stroke of the ink-pad carrier. Fig. 18, Sheet 5, is a rear elevation of the parts which are shown in Fig. 17. Fig. 19, Sheet 6, shows on an enlarged scale a large type-head, suitable for printing upon cartons, applied to the lower end of the type-head carrier.

Having reference to the drawings, the machine-frame comprises the base 1, the side-pieces or cheeks 2, 3, rising from the said base, and the cross-tie 4, shown in Fig. 1, extending from one side-frame to the other near the top.

The work-support is shown in place in the machine in Figs. 1, 2, 3, and separately in Fig. 5, Sheet 4. It comprises an arm 5, projecting forwardly from between the side-pieces or cheeks 2, 3, (see Figs. 2 and 3) and having at its outer end a relatively-raised portion, 6, shown best in Figs. 2 and 3, provided with a work-rest consisting of a block or pad 7, Figs. 1, 2, 3, 5, which may be composed of rubber or other yielding material.

The arm 5 at its inner end is connected or formed in one with a transversely-extending rocker 8, 8, (shown best in Figs. 1 and 5). The said rocker extends across the machine between the side-pieces or cheeks 2, 3, and is supported at its ends by opposed taper centers applied to the side-pieces or cheeks, and upon which the work-support is adapted to be rocked or swung. The said taper centers are arranged to be adjusted to take up play or looseness between the same and the ends of the rocker, and also to adjust the work-support transversely with reference to the type-head. Thus, 9, 9, Figs. 1, 2 and 5, are center-screws that are fitted to threaded holes tapped in the side-pieces or cheeks. Their conical inner ends enter conical recesses 8ᵃ, 8ᵃ, Fig. 5, that are formed in the ends of the rocker. Upon the center-screws 9, 9, are fitted check-nuts 10, 10, Figs. 1, 2, 3, which are tightened up against the outer surface of the side-pieces or cheeks to prevent accidental loss of adjustment of the center-screws. The center-screws may be adjusted so as to take up wear between the same and the ends of the rocker, and they enable the work-support to be set and adjusted in assembling and setting-up the machine without necessity for fine machining in making the parts. The supporting portions of the rocker are of considerable length at opposite sides of the arm 7, which insures steadiness and obviates tendency of the work-support to rock or tip transversely. Thereby the upper surface of the work-supporting pad is prevented from becoming inclined transversely. The work-support is sustained in its normal position by contact of the foot of the pin 11 carried thereby with the top surface of the bed 1. The said pin is shown in connection with the work-support in Figs. 1, 2, 3, and separately in Fig. 6, Sheet 4. It occupies a vertical position at the center of a chamber, 5ᵃ, Fig. 5, Sheet 4, that is made in the arm 5, the upper end of the pin being reduced in diameter and screw-threaded for a portion of its length, and the arm being formed in its top at the upper end of the chamber with a central hole of correspondingly reduced diameter through which the reduced end of the pin extends, as shown by Figs. 2 and 3, the threaded portion of the pin above the arm having applied thereto the nut 12 and check-nut 12ᵃ. The enlarged circular foot of the pin projects below the arm 5 to make contact, as above mentioned, with the top surface of bed 1. To afford a yielding cushion for the work-support, adapted to yield under the stroke of the printing-head against the work resting upon the work-support, so as to accommodate the thickness of the said work, an expanding spiral spring, 11ᵃ, is placed within the chamber of arm 5, around the pin, it being confined between the foot of the pin and the top of the chamber. Adjustment of the nut 12 and check-nut 12ᵃ operates to vary the extent to which the foot of the pin projects below the arm, so as to adjust the height of the work-support. The pin is prevented from turning by means of a projection 11ᵇ extending radially from the foot of the pin and working in a vertical notch 11ᶜ in the wall of the chamber 5ᵃ. By turning the nuts 12 and 12ᵃ in one direction or the other, the position of the work-support, and thereby that of the exposed surface of the pad 7 with respect to the extreme or limit of the printing stroke of the type-head, may be adjusted vertically so as to secure a proper imprint or impression, and such position may be varied to suit the thickness of the article to be printed upon.

The work-rest 7 with which the work-support is furnished is of a size to suit the article to be printed upon and to correspond with the length and width of the imprint. In Figs. 1, 2, 3 and 5 it is shown of proportions suitable for laundry-work and the like. The extent of the projection of the work-support forwardly beyond the side-frames and base of the machine-frame is such as to facilitate the application of the work thereto. In the present instance, it is equal to or greater than the depth of the deepest carton the machine is designed to operate upon, in order to permit a carton of such depth to be placed upon the work-support and receive the imprint upon the required portion or portions thereof.

The type-head is shown in connection with the rest of the machine in Figs. 1, 2, 3, and separately in Fig. 4, Sheet 3, and Figs. 7 and 8, Sheet 4. Details thereof are shown separately in Figs. 7ᵃ, Sheet 4, and 9 to 14, Sheet 5. It comprises a top-piece 13 and opposite side-pieces or cheeks 14, 14. The type-carriers are arranged between the said side-pieces or cheeks 14, 14. The type-carriers are constituted in this instance by a series of type-wheels 15, 15, etc. These are shown best in Figs. 7 and 8, Sheet 4. They are mounted side by side upon a barrel composed of cylindrical sections 16 (shown separately in Figs. 11 and 12, Sheet 5) and 17 (shown separately, in Figs. 9 and 10, same sheet) on a supporting shaft 18 extending cross-wise of the type-head and having bearings in holes formed in the side-pieces or cheeks 14, 14, as shown in Figs. 4 and 7. The type-wheels are separated from one another and spaced at the proper distance apart by washers 19, 19, etc., also mounted upon the outside of barrel 16, 17. The washers and type-wheels alternate, and one of the washers is placed at the outside of each of the end type-wheels of the series, so that each type-wheel has washers in contact with both surfaces thereof. The combined series of type-wheels and washers is confined in place upon the barrel by means of rims or flanges 161, 171, with which the respective sections of the barrel are provided, as shown in Figs. 4, and 9 to 12. To permit the respective type-wheels to be shifted or set independently of one another so as to place the required types or printing characters thereof in the printing line, they are made with circular central openings which fit the cylindrical exterior of the barrel, the type-wheels being capable of relative turning movement upon the said exterior. The washers, however, are interlocked with the barrel so that they cannot turn relatively to the barrel. Thus, each thereof is formed with an inwardly-extending tooth or spur 20, Fig. 8, Sheet 4, and Fig. 13, Sheet 5, and the barrel is formed with a longitudinally extending groove or key-way 21, Fig. 8, Sheet 4, and Figs. 9 to 12, Sheet 5, into which the teeth or spurs of the series of washers enter when the said washers are fitted upon the said barrel. One portion of the length of the said groove or key-way is formed in the barrel-section 16, and the other portion thereof in the barrel-section 17.

In consequence of the fact that the washers by which the type-wheels are separated from one another are incapable of turning movement relative to the barrel, a rotary shift or adjustment of any one of the type-wheels relative to the barrel may be effected without disturbing the positions of adjacent pipe-wheels. The side-surfaces of the washers and type-wheels make contact with one another, but not in such manner as to lock the type-wheels positively from relative movement, the engagement being merely frictional.

To facilitate the application of the washers and type-wheels to the exterior of the barrel, the barrel is formed in the two cylindrical sections 16, 17, previously mentioned. To enable these to be fitted together, with the type-wheels and washers thereon before the barrel is slipped upon the supporting-shaft 18, the section 16 is provided with the reduced cylindrical extension 162, Fig. 11, upon which the section 17, Figs. 9 and 10, fits. The two sections are held together by means of longitudinally extending screws 22, 22, and expanding spiral springs 23, 23, Fig. 7. To receive the said screws and springs, the section 16 is formed with longitudinal holes 24, 24, Figs. 8, 11 and 12, which for the greater portion of their length are of a diameter large enough to receive the enlarged or flanged heads of the said screws, but at their inner ends are smaller in diameter to fit the stems of the screws. The spiral springs 23, 23, surround the stems of the screws within the large parts of the said holes, as shown in Fig. 7, and are compressed between the inner sides of the screw-heads and the shoulders at the inner ends of the large parts of the holes. The threaded portions of the stems of the screws are screwed into threaded holes 172, 172, Figs. 9 and 10, which are tapped in the section 17. By their tendency to expand lengthwise the springs draw the sections of the barrel endwise toward each other so as to cause the flanges 161, 171, to press the washers and type-wheels into contact with one another. By screwing the screws in farther, or unscrewing them, the extent of the compression of the springs may be varied, so as to vary the tension of the springs and thereby adjust the degree of frictional engagement between the type-wheels and the washers. The screws 22, 22, cause the two sections of the barrel to turn in unison with each other, and the barrel is caused to turn in unison with the central shaft 18 by means of a projection 25, Fig. 7, extending radially from the said shaft and entering a notch 26, Fig. 11, in the extension 162 of section 16. For convenience in turning the shaft 18 by hand, it is furnished with a knurled head 181, Figs. 1, 3 and 7.

The type-wheels are locked in the positions to which they have been adjusted in being set, and are held from undesired turning movement, by means of movable detents 27, 27, etc., which in this instance are mounted upon a pivotal pin 28, Figs. 2, 3, 8, located at the front of the type-head and carried by the side-pieces or cheeks 14, 14. One of these detents is provided for each type-wheel. Each detent is provided with an acting portion shaped to correspond with the spaces or notches between successive types of the type-wheel with which such detent co-acts, (see, more particularly, Fig. 8) and to engage with the types between which it may be entered so as thereby to hold the type-wheel from rotation in either direction. The detents are caused to engage with the type-wheels, and normally are kept in engagement therewith, by means of spring-actuated plungers 29, 29, etc., Figs. 2, 3, 8, one for each detent. The said plungers, and the expanding spiral springs 30, Fig. 8, by which they are actuated, are contained within holes 30ª, 30ª, etc., Fig. 7, that are formed in the top-piece 13 of the type-head. In this instance, the detents are formed as levers, with downwardly extending arms which are provided with the acting portions that engage the type-wheels to lock the latter from rotation, and with upwardly-extending arms receiving the pressure of the spring-actuated plungers and in addition constituting finger-pieces which may be pressed upon manually to turn the detents so as to disengage them from the type-wheels.

Should the shaft 18 be rotated by hand, without any of the detents having been disengaged by hand from the type-wheels, the shaft, barrel, and washers will turn without turning the type-wheels, which last will be kept from moving by the detents. But should one of the detents, or more than one thereof, be disengaged from the corresponding type-wheel or type-wheels, and be kept out of engagement therewith while the shaft 18 is rotated, then such type-wheel or type-wheels will be caused by the frictional engagement of the adjacent washers therewith to turn in unison with the said washers and the shaft relative to the remaining type-wheels, which, continuing to be held by their detents, will remain stationary. Thereby convenient provision is made for setting the respective type-wheels to place the desired types or printing characters thereof in the printing line.

It will be perceived, that for the purpose of the adjustment, it is necessary only to press upon the detent of the type-wheel which it is desired to adjust or set, and to hold such detent disengaged from such type-wheel while the shaft 18 and the said type-wheel are being turned to the extent required for placing the required type or character of such type-wheel in the printing line.

By turning the screws 22, 22, to increase the degree of frictional engagement between the washers and type-wheels, compensation for wear between the contacting surfaces of the washers and type-wheels may be effected. To enable the screws to be turned with the type-head in place in the machine, a hole 22ª, Fig. 7, is made in one side-piece or cheek 14. The hole is large enough to receive the working end of a screw-driver suitable for turning the screws 22, 22, and by turning the barrel to place the said screws successively in register with the hole 22ª, each thereof may be turned to the required extent.

To facilitate the removal and replacement of the assembled series of type-wheels bodily from the type-head, the cheek or side-piece 14 next adjacent the knurled head 181 is made with a notch 14ª, Fig. 7ª, Sheet 4, opening radially from the hole 14ᵇ that is made for the reception of the shaft 18. This notch is large enough to allow pin or projection 25 to pass therethrough. To provide for the withdrawal of the shaft 18, the latter is turned by force applied to the said knurled head, until the pin or projection registers with the notch, and then the shaft is pulled endwise, withdrawing it from the center of the said series of wheels and from the bearings in the side-pieces or cheeks 14, 14, the pin or projection moving through the notch. The withdrawal of the shaft permits the series of wheels to drop or be taken out from between the side-pieces or cheeks. This capacity for removal of the series of wheels is very important because it enables them to be taken out at any time and be placed in a liquid that will dissolve out accumulations of ink, thereby enabling the wheels to be kept clean without the labor of brushing them out by hand while in place in the machine. It provides, also, for quick substitution of another set of wheels. This feature of providing for the ready disconnection, removal, and replacement of the assemblage of type-wheels as a unit is made the subject of claim in a divisional application filed by me January 10, 1910, Serial No. 537,101.

The type-head-carrier 31 is shown in place in the machine in Figs. 1, 2 and 3. Its lower end is formed at its under side with a face against which the upper surface of the top-piece of the type-head fits, as shown in Figs. 1 to 4, 7 and 8, and with opposite lateral projections in which are made holes to receive the bolts 32, 32, by which the type-head is secured to the type-carrier. Lips 33, 33, at the front and rear of the said face hold the type-head from shifting or turning horizontally in the direction from front to rear in the machine, out of correct position. Intermediately of its height the type-head carrier is formed with an opening within which is received the forward end of the radius-arm, presently to be described, and the top part of the said carrier is formed with an opening to receive the free extremity of the forwardly-extending arm of the actuating rocker, also presently to be described.

The described means and mode of connecting the type-head with the type-head carrier enable the type-head to be detached from the type-head carrier whenever required, or applied thereto, and also permit type-heads of greater or less width corresponding with a greater or less number of type-wheels to be applied interchangeably to the type-head carrier without necessitating the use of a different size or shape of type-head carrier.

At 34, Figs. 1, 2, 3, is the lever-like rocker through which motion is transmitted to the type-head carrier. The rocker-portion 341 thereof is located between the side-pieces or cheeks 2, 3, of the machine frame at the top thereof, and the ends of the oppositely-extending arms of the said rocker-portion are supported by the center-screws 35, 35, applied to the said side-pieces or cheeks and provided with the check-nuts 36, 36. The free extremity of the forwardly-extending arm of the said rocker enters the opening of the forked upper end of the type-head carrier, and is engaged by center-screws 37, 37, fitted to the opposite members of the fork and provided with the check-nuts 38, 38. When the rocker is rocked by the means presently to be explained the type-head carrier is operated so as to move the type-head and its type-carriers toward and from the work-support.

The radius-arm 39 shown in Figs. 1, 2, 3, is provided with a rocker-portion 391 extending transversely with respect to the side-pieces or cheeks 2, 3, of the machine frame, and located between the same at the front of the machine. The ends of the oppositely-extending arms of the said rocker-portion are supported by center-screws 40, 40, fitted to threaded holes that are tapped in the side-pieces or cheeks 2, 3, and furnished with check-nuts 41, 41, that are turned up against the outer surfaces of the side-pieces or cheeks. The free extremity of the radius-arm enters the opening formed as above described intermediately of the height of the type-head carrier and is engaged by the center-screws 42, 42, fitted to threaded holes that are tapped in the opposite side-portions of the intermediate portion of the type-head carrier, the said center-screws having applied thereto check-nuts 43, 43, which make contact with the outer surfaces of the said side-portions. The mode of connection of the type-head carrier with the rocker 34 and with the radius-arm 39 holds the type-head carrier from twisting or turning and obviates the necessity for the employment of guides. The center-screws 35, 35, and 40, 40, enable the rocker and radius-arm to be adjusted transversely into proper working relations with respect to each other, and the type-head carrier, and also provide for transverse adjustment of the type-head carrier relative to the work-support. The center-screws 37, 37, 42, 42, enable the type-head carrier to be adjusted transversely relative to the forward extremities of the rocker and the radius-arm, and also relative to the work-support. The rocker and radius-arm act after the fashion of parallel links, and in addition to furnishing the entire support to the type-head carrier, control the path of movement of the latter and the type-head.

An ink-pad is shown at 44, Figs. 1, 2, 3, and 45 is an ink-pad carrier which is shown in place in the machine in Figs. 1, 2, 3, and separately in plan in Fig. 15, Sheet 5. The said ink-pad carrier consists of a forwardly-extending arm, and a rocker-portion, 46, extending transversely with relation to the side-pieces or cheeks 2, 3, of the machine frame and fitting between the same. Center-screws 47, 47, fitted to threaded holes which are tapped in the said side-pieces or cheeks engage with and support the ends of the opposite arms of the rocker-portion 46 of the ink-pad carrier, and check-nuts 48, 48, upon the said screws engage with the outer surfaces of the side-pieces or cheeks. By means of said center-screws the ink-pad carrier and its ink pad may be adjusted transversely with relation to the type-head. For the purpose of operating the ink-pad carrier with timing properly coördinated with the movements of the type-head carrier and type-head, it is joined by a Y-shaped link 49, (shown in place in the machine in Figs. 2 and 3, and separately in Fig. 16, Sheet 5,) to an arm 31ᵃ extending downward and rearward from the typehead carrier. The lower end of the said arm 31ᵃ enters between the opposite members or branches of the forked upper end of the link 49, and the arm and the said members or branches are connected with each other through the pivotal engagement of the upper ends of the said members or branches with the projecting opposite ends of a long pin, 50, Figs. 2, 3, 17 and 18 (Sheet 5) which occupies a hole extending lengthwise through a cylindrical piece 55 fitted within a cylindrical opening extending transversely through the lower end of arm 31ᵃ. The said members or branches are formed with holes 50ᵃ, 50ᵃ, for the reception of the said ends of the pin 50. The body-portion of the ink-pad carrier 45 is formed with an opening 52, Fig. 15, which receives the lower end of the link 49, the said lower end being connected with the ink-pad carrier by means of center-screws 53, 53, Figs. 1, 2, 3, fitting threaded holes 53ᵃ, 53ᵃ, Fig. 15, Sheet 5, which are tapped in the opposite side-portions of the ink-pad carrier and provided with check-nuts 54, 54, which make contact with the outer surfaces of the said side-portions. The connection of the link 49 with the ink-pad carrier 45 is at an intermediate point between the ink-pad and the pivotal axis of the rocker-portion of the ink-pad carrier.

For purposes of adjustment, to enable the pressure of the ink-pad 44 against the printing surfaces of the type-wheels at the time of contact to be varied, the pin 50 is mounted in the cylinder 55 eccentrically with relation to the axis of the latter, and the said cylinder is adapted to be rotated within the opening in arm 31ᵃ in which it is placed. The said cylinder is fixed in place within the said hole, in the position in which it has been set, by means of a binding-screw 56, Figs. 2, 3, 17 and 18, the stem of which fits a threaded hole that is tapped in arm 31ᵃ while the inner end thereof is arranged to bite against the periphery of the cylinder. By loosening the binding-screw 56 and turning the cylinder more or less with the aid of the knurled head 50ᵇ of the pin 50, the position of the said pin may be shifted so as to cause the inking-pad carrier to be operated to occasion the required pressure of the inking-pad against the types or printing characters of the type-wheels which are in position for printing, after which the binding-screw will be tightened upon the cylinder once more to retain the latter in its position of adjustment. For convenience in assembling the parts, and in separating them when necessary, the pin 50 is fitted easily to the opening which it occupies, and it is held in place therein by a clamping screw 50ᶜ, Figs. 17 and 18, working in a threaded hole that is tapped transversely through the cylindrical piece. To restrain the cylinder from displacement lengthwise thereof, the head end of the screw 50ᶜ projects from the periphery of the cylinder and enters a slot 56ᵃ in the wall of the opening which contains the cylinder. The said slot is elongated to accommodate the movement of the head of the screw as the cylinder is turned in making adjustments.

For the actuation of the rocker, the rear arm thereof has joined thereto the upper end of a pitman or connecting-rod 57, Figs. 2, 3, the other end of which is fitted to the pin of a crank 58, Fig. 2, that is fast upon the inner end of a short rotating shaft 59 which is supported in a bearing with which sidepiece or cheek 3 is provided. The said rear arm of the rocker is forked to receive the upper end of the pitman or connecting-rod, the said end being engaged by center-screws 60, 60, fitted to threaded holes that are tapped through the arms or branches of the fork, the said center-screws having thereon check-nuts 61, 61, which are tightened up against the outer surfaces of the said arms or branches.

For the purpose of rotating the crankshaft 59 when it is desired that the machine shall operate to stamp or print, the machine is provided with a power or driving-shaft 62 extending transversely and mounted in bearings in the side-pieces or cheeks 2, 3. Shaft 62 is provided at one end with a bandpulley 63, Figs. 1 and 2, which receives a suitable driving-band, 64, Fig. 1, by means of which power is transmitted to rotate the said band-pulley and driving-shaft. The driving-shaft has fixed thereon a spur-pinion 65, Figs. 1, 2, 3, meshing with a spurgear, 66, which is mounted upon the crankshaft 59, or concentrically therewith, with capacity to turn independently of the crankshaft. Ordinarily, the spur-gear 66 turns loosely upon the crank-shaft without rotating the latter, and the working parts of the machine remain at rest.

For the purpose of enabling the machine to be actuated to print, when required, it is provided with a clutch by means of which the spur-gear 66 may be made fast to the crank-shaft temporarily. The clutch may be of any approved character. In this instance, the projections 67, 67, etc., Figs. 1, 3, extending out from one side of the spurgear, and the clutch-arm 68 pivotally hung upon the outer end of the crank-shaft, form portions of a clutch suitable for the purpose. At 69 is the clutch controlling lever, or, as it may also be termed, the start and stop lever, it having joined thereto a connection 70 leading to a suitable treadle, not shown, and by means of which treadle and connection the lever 69 may be operated at will to permit or cause the clutch to couple the spur-gear 66 and crank-shaft 59 together, to cause the machine to act. At 71, Fig. 3, is a spring by means of which as soon as lever 69 is left free to return to normal position the said lever is restored to such position and caused by its engagement with the arm 68 to unclutch the spur-gear and crank-shaft from each other and arrest the rotation of the crank-shaft with the parts of the machine in a predetermined position. At 69ᵃ is a latching spring, carried by lever 69, and acting to engage with the free end of arm 68 as soon as such arm has been disengaged from a projection 67 of spur-gear 66 by the inclined upper end of lever 69. By its engagement with the upper surface of the said arm the latching spring 69ᵃ prevents the arm from rebounding from the stop-shoulder 69ᵇ of lever 69, and also prevents the crank-shaft from turning backwardly under the influence of the weight of the type-head carrier and type-head transmitted through rocker 34 and link 57 to crank 58. As clutches and start and stop mechanism combined therewith are old and well-known in various connections, and as the general mode of operation is well understood by those who are skilled in this and related arts, it is unnecessary to go farther into detail.

The start and stop devices are arranged to arrest the motion of the machine with the working parts in the positions shown in Figs. 1, 2, 3, namely, with the crank 58 approaching bottom center and the type-head carrier and type-head raised through the greater portion of the upward movement thereof, but yet somewhat below the highest position, and somewhat to the rear, and with the ink-pad at a short distance from the peripheries of the type-wheels, clear of the printing characters or types on the latter, and partly retracted to the rear. The elevated position of the type-head, and the retracted position of the inking device, give access to the type-wheels, which enables them to be conveniently and readily shifted or set by turning the same in the manner which has been explained. If, now, the lever 69 and its latching spring 69ᵃ are operated to release the clutch-lever 68, the latter is swung by the action of a spring (not shown) into the path of one of the clutch-projections 67, and, becoming engaged by the latter, the crank-shaft is caused to rotate. As the machine starts, the type-head carrier is raised from its position in Figs. 1, 2, 3, to the highest position, and then is moved down to its lowest position to cause the printing line of characters to make an impression upon the article resting on the work-support, and then is returned to its position in Figs. 1, 2, 3, whereupon the clutch is opened and the rotation of the crank-shaft arrested. As the type-head carrier is raised from the position of Figs. 1, 2, 3, the link 49 causes the ink-pad carrier 4 to swing upward. Inasmuch as the point of connection of the link with the ink-pad carrier is intermediate the pivotal axis of the latter and the free end thereof carrying the ink-pad 44, the said free end moves at relatively increased speed so that in the rise of the type-head carrier the ink-pad gains on the type-wheels until it makes contact with the characters or types in the printing line. In the rising movement of the type-head carrier it also shifts rearward somewhat, as the rocker-arm 34 and radius-arm 39 swing about their respective centers, thus carrying the center of the type-wheels over the ink-pad. The ink-pad assumes a horizontal or substantially horizontal position as it nears the end of its upward movement, and its path of movement in approaching the type-wheels is so nearly radial with respect to the type-wheels, that in touching the type it presses squarely against the same without appreciable sliding contact. Thereby tendency to cause the ink from such pad to accumulate upon the characters or types so as to clog the latter is reduced, and the frequency with which the characters or types have to be cleaned is lessened. As the type-head carrier moves downward to produce the impression, the more rapid movement of the ink-pad carrier separates the inking-pad from the type-wheels and at the time the type-wheels reach the article resting upon the work-support the ink-pad carrier occupies a downwardly-extending position at the rear of the type-head.

The type-head of Figs. 1, 2, 3, 4, 7, 8, is of a character adapted, more especially, for laundry use and the like work. Fig. 19, Sheet 6, shows the application to the type-head carrier of a type-head constructed and equipped for printing cartons for containing shoes. This head is considerably wider than that first described, and contains a much larger series of wheels, namely a set, 15ᵃ, of wheels for use in marking the size of the shoes upon one end of the flange of the carton, a wide-faced wheel, 15ᵇ, for printing the name of the style, and a set, 15ᶜ, of wheels for use in marking the case number of the shoes. The means of supporting and setting the individual wheels, including the detents, is essentially the same as in the case of the type-head first described. When the type-head of Fig. 19 is employed, an ink-pad support and ink-pad, and a work-support, all corresponding in width with such type-head will be substituted for that shown in Figs. 1, 2, 3, etc. of the drawings.

In order to counterbalance the weight of the type-head carrier and type-head so as to improve the working of the machine and reduce the tendency to violent action and wear, and also to obviate the tendency of such weight to cause the said parts to drop as soon as the clutch-lever 69 and its latching spring 69ᵃ are disengaged from the clutching-arm 68 and the crankshaft and crank thereby are rendered free to turn reversely under the influence of the said weight, I provide a counterbalancing device which in the present instance is constituted by the contracting spiral spring 72, the latter having one end thereof engaged with the rear arm of rocker 34 and the other end thereof engaged with one of the supporting portions of the rocker 391 of the radius-arm 39.

The space above the work-support is open and unobstructed at the rear of the same, and continues clear, between the side-frames 2, 2, to the back of the machine. A strip or article of any length may be pushed through between the said side-frames, as far as may be necessary in order to enable an imprint to be made upon any desired portion of the length of the same. The adjusting device and cushion in connection with the work-support arm enable the said arm and its work-rest to be set so that in the printing movement of the type-head the faces of the types which have been brought into printing position shall encounter the article lying upon such work-rest a little before the completion of the said movement. As the movement is completed, the work-support arm will be depressed slightly. Thereby, the duration of the contact between the inked faces of the said types and the said article will be increased, and the ink carried by the types will be more completely transferred to the article and more effectually impressed into the same.

I claim as my invention:—

1. In a stamping or numbering machine, in combination, the opposite frame-sides or cheeks spaced apart transversely, the type-head, the rocker having the forwardly-projecting arm to which the type-head is hung, and also having oppositely-extending transverse rocker-portions in pivotal engagement at their extremities with the frame-sides or cheeks, whereby widely-separated supporting bearings for the said rocker are provided, and the stationary work-support arm having similar oppositely-extending transverse rocker-portions and bearings, and also having a forward extension and a work-rest provided thereon.

2. In a stamping or numbering machine, the combination with the machine-frame having its opposite sides or cheeks separated by an unoccupied space rearward of the work-rest, the type-head, and the rocker to the forward end of which the type-head is hung, the said rocker itself being hung by its rear portion between the said sides or cheeks and projecting forwardly therefrom, of the stationary work-support arm similarly hung and projecting, and having its forward extension and the work-rest clear of the machine-frame and bed to permit a carton or the like to be fitted around them, and adjusting means to vary the working position of the stationary work-support arm vertically around its connection with the sides or cheeks.

3. In a stamping or numbering machine, in combination, the opposite frame-sides or cheeks spaced apart transversely, the type-head, the rocker having the forwardly-projecting arm to which the type-head is hung, and also having oppositely-extending transverse rocker-portions in pivotal engagement at their extremities with the frame-sides or cheeks, whereby widely-separated supporting bearings for the said rocker are provided, the work-support arm having similar oppositely-extending transverse rocker-portions and bearings, and also having a forward extension and a work-rest in connection therewith, and a cushioning support for the work-support arm itself.

4. In a stamping or numbering machine, the combination with the machine-frame having opposite sides or cheeks, of the type-head, and the type-head supporting rocker to which the type-head is hung, and the stationary work-support arm provided with a work-rest, both hung between the said sides or cheeks, of means to adjust vertically the working position of the said stationary arm and its work-rest upon its connection with the sides or cheeks.

5. In a stamping or numbering machine, in combination, the opposite frame-sides or cheeks spaced apart transversely, the type-head, the rocker having the forwardly-projecting arm to which the type-head is hung, and also having oppositely-extending transverse rocker-portions in pivotal engagement at their extremities with the frame-sides or cheeks, whereby widely-separated supporting bearings for the said rocker are provided, the work-support arm having similar oppositely-extending transverse rocker-portions and bearings, and also having a forward extension and a work-rest in connection therewith, a cushioning support for the work-support arm, and adjusting means in connection with the said support to adjust the arm vertically.

6. In a stamping or numbering machine, the combination with the freely-suspended type-head, of the rocker and swinging arm actuating the type-head and by joint coöperation therewith controlling its path of movement, and the swinging ink-carrier actuated to supply ink to the printing characters for the impression by the movement by which the operation of the type-head is effected.

7. In a stamping or numbering machine, the combination with the freely-suspended type-carrier support, of the rocker and swinging arm actuating the type-head and by their joint coöperation therewith controlling its path of movement, and the swinging ink-carrier operatively connected with the type-head and actuated thereby to furnish ink to the printing characters for the impression.

8. In a stamping or numbering machine, the combination with a type-carrier support, an actuating rocker having an arm connected with the said support, and a radius-arm directing the said support in its movement, of a swinging ink-pad holder, and a link joining the said type-carrier support and the ink-pad holder, and connected with the latter at a point between the pivot and the ink-pad, the said ink-pad holder being arranged to move squarely against the faces of the types of the printing line.

9. In a stamping or numbering machine, the combination with a moving type-carrier support, of a swinging ink-pad holder, a link joining the said support with the ink-pad holder, and means to adjust the link to vary the pressure of the ink-pad against the faces of the types.

10. In a stamping or numbering machine, the combination with a moving type-carrier support, of a swinging ink-pad holder, a link joining the said support and the ink-pad holder, and an eccentric connection between the link and one of the connected parts, adjustable to vary the pressure of the ink-pad against the faces of the printing characters.

11. In a stamping or numbering machine, the combination with the machine-frame having opposite sides or cheeks, of the type-carrier support, the actuating rocker and swinging arm, respectively hung between the said sides or cheeks and projecting forward therefrom, the swinging ink-carrier hung between the said sides or cheeks and projecting forward therefrom, and the link joining the said support and the said ink-carrier and transmitting movement to the latter to supply ink to the printing characters.

12. In a stamping or numbering machine, the combination with the type-carrier support, the rocker and swinging arm by which the said support is actuated and controlled as to its path of movement, and the swinging ink-carrier linked to the said support and deriving its movements therefrom, the said rocker, swinging arm, and ink-carrier, respectively, having opposite axial extensions, of the bearings at opposite ends of the said axial extensions supporting the said rocker, swinging arm, and ink-carrier, respectively.

13. In a stamping or numbering machine, the combination with a suspended type-carrier support, and the rocker and swinging arm by which the said support is actuated and through the joint coöperation of which it is controlled as to its path of movement, of adjustable opposed taper centers supporting the rocker and arm.

14. In a stamping or numbering machine, the combination with a suspended type-carrier support, the rocker and swinging arm by which jointly the said support is actuated and controlled as to its path of movement, the swinging ink-carrier operatively connected with the said support and actuated through the movement transmitted to the latter, of adjustable opposed taper centers supporting the rocker, arm, and ink-carrier.

15. In a stamping or numbering machine, the combination with a type-carrier support, of a swinging rocker with which the said support is connected, a swinging radius-arm by which the said support is directed in its movement, a continuously-operating driving means, and means to connect and disconnect the said driving means and rocker.

16. In a stamping or numbering machine, the combination with a type-carrier support, of a swinging rocker having the said support connected with one arm thereof, a swinging radius-arm by which the said support is directed in its movement, a crank in operative connection with a second arm of the said rocker, a continuously-operating driving means, and means to connect and disconnect the said driving means and crank.

17. In a stamping or numbering machine, the combination with the type-carrier support, and the rocker and swinging arm by which the said support is actuated and controlled as to its path of movement, of adjustable opposed taper centers connecting the rocker and arm, respectively, with the type-carrier support.

18. In a stamping or numbering machine, the combination with the type-carrier support, of the rocker and swinging arm actuating the said support and controlling its path of movement, the said support being fitted to the rocker and arm by forked or divided portions between which projecting portions extend, and connected therewith by opposed taper centers.

19. In a stamping or numbering machine, the combination with a series of type-wheels and washers arranged in alternating succession and in frictional contact with one another, means to turn the set of washers, and means to control the turning of the type-wheels by the washers in setting the type-wheels, of means acting to automatically take up wear of the surfaces in contact.

20. In a stamping or numbering machine, the combination with a series of type-wheels and washers arranged in alternating succession, spring-actuated means to hold the surfaces of said type-wheels and washers in contact with one another, and means to turn the set of washers, of means to control the turning of the type-wheels by the friction of the washers.

21. In a stamping or numbering machine, the combination with a central barrel, a series of type-wheels and washers arranged in alternating succession on the said barrel, means to turn the said barrel and washers, and means to control the turning of the type-wheels by the friction of the washers, of a spring acting to press the surfaces of said type-wheels and washers into contact with one another.

22. In a stamping or numbering machine, the combination with a central barrel, a series of type-wheels and washers alternating upon said barrel, means to turn the said barrel and washers, and means to control the turning of the type-wheels by the friction of the washers, of a spring which presses the surfaces of the type-wheels and washers into contact with one another, and means to adjust the tension of the said spring.

23. In a stamping or numbering machine, the combination with a series of type-wheels and washers in alternating succession, a central barrel having heads or flanges between which the said type-wheels and washers are confined, and means to control the turning of the type-wheels by the friction of the washers, of a spring tending to move such heads or flanges relatively toward each other, to thereby press the type-wheels and washers into close contact.

24. In a stamping or numbering machine, the combination with a series of type-wheels and washers in alternating succession, a central barrel having heads or flanges between which the said type-wheels and washers are confined, and means to control the turning of the type-wheels by the friction of the washers, of a spring tending to move such heads or flanges relatively toward each other, to thereby press the type-wheels and washers into close contact, and means to adjust the tension of such spring.

25. In a stamping or numbering machine, the combination with a series of type-wheels and washers in alternating succession, a central barrel composed of sections in line with each other and provided with heads or flanges between which the type-wheels and washers are confined, and means to control the turning of the type-wheels by the friction of the washers, of a longitudinal screw working within one section and engaged with the other thereof to cause said sections to turn in unison, and a spring maintained under tension by the said screw and tending to move the said sections toward each other to cause the said heads or flanges to press the type-wheels and washers into close contact.

26. In a stamping or numbering machine, the combination of the type-head comprising opposite side-pieces or checks, and the top-piece having a transversely-extending contact face, and the assembled series of type-wheels mounted between the said side-pieces or checks, with the carrier having a transversely-extending contact face against which the corresponding face of said top-piece fits and provided with opposite transversely-extending projections, and a lip engaging with the said top-piece and thereby preventing the type-head from turning into misplaced position, and bolts passing through holes in said transversely-extending projections and securing the type-head removably to the type-carrier.

27. In a stamping or numbering machine, the combination with the type-head, and an inking device actuated to apply ink to the printing characters through the motion that is transmitted to the type-head, of means acting to arrest the type-head with its retracting movement partly completed and the inking device in a retracted position.

28. In a stamping or numbering machine, the combination with the type-head, and an inking device actuated to apply ink to the printing characters through the motion that is transmitted to the type-head, and power-driven actuating means for the said type-head embracing a clutch, of means acting to unclutch the type-head and arrest the latter with its retracting movement partly completed and the inking device clear of the type-carriers, at the rear of the type-head.

29. In a stamping or numbering machine, the combination with the type-head, an inking device actuated to apply ink to the printing characters through the motion that is transmitted to the type-head, the rotating crank operatively connected with the said type-head, and crank-actuating means constructed and arranged to be operatively connected therewith and disconnected therefrom, of means acting when the driving power is disconnected from the crank to arrest the rotation of the latter with the type-head in a partly-upraised position.

30. In a stamping or numbering machine, the combination with the type-head, the rotating crank operatively connected with the said type-head, and a stop by which the rotation of the said crank is arrested with the type-head in a partially-upraised position, of a latch by which reverse movement of the crank is prevented.

31. In a stamping or numbering machine, the combination with the type-head, the rotating crank operatively connected with the said type-head, a stop by which the rotation of the said crank is arrested with the type-head in a partially-upraised position, and a latch which prevents reverse movement of the crank, of a counterbalance for the type-head obviating tendency of its weight to occasion reverse turning of the crank when freed from the control of the latch.

32. In a stamping or numbering machine, the combination with the type-head, the rotating crank operatively connected with the said type-head, actuating means for said crank embracing a clutch, a start and stop lever in control of said clutch and acting to disconnect the clutch and arrest the rotation of the crank with the type-head in a partially-upraised position, and a latch which prevents reverse movement of the crank, of a counterbalance for the type-head obviating tendency of its weight to occasion reverse turning of the crank when the latter is freed from the control of the latch.

33. In a stamping or numbering machine, the combination with the machine-frame having its opposite sides or cheeks separated by an unoccupied space rearward of the work-rest, the type-head, and the rocker to the forward end of which the type-head is hung, the said rocker itself being hung by its rear portion between the said sides or cheeks and projecting forwardly therefrom, of the stationary work-support arm similarly hung and projecting, and having its forward extension and the work-rest clear of the machine-frame and bed to permit a carton or the like to be fitted around them, a cushion directly combined with the work-support arm, and adjusting means to vary the working position of the stationary work-support arm vertically around its connection with the sides or cheeks.

In testimony whereof I affix my signature in presence of two witnesses.

FRANK W. MERRICK.

Witnesses:
  CHAS. F. RANDALL,
  EDITH J. ANDERSON.